(12) United States Patent
Popham

(10) Patent No.: US 6,948,734 B2
(45) Date of Patent: Sep. 27, 2005

(54) TRAILER HITCHING APPARATUS

(76) Inventor: Brian E. Popham, 3089 Nursery Rd., Smyrna, GA (US) 30082

( * ) Notice: Subject to any disclaimer, the term of this patent is extended or adjusted under 35 U.S.C. 154(b) by 0 days.

(21) Appl. No.: 10/739,604

(22) Filed: Dec. 18, 2003

(65) Prior Publication Data

US 2004/0227324 A1 Nov. 18, 2004

Related U.S. Application Data

(60) Provisional application No. 60/456,061, filed on Mar. 20, 2003.

(51) Int. Cl.[7] .............................................. B60D 1/44
(52) U.S. Cl. ................... 280/478.1; 280/491.1
(58) Field of Search ................... 280/491.1, 478.1, 280/477, 479.1, 480, 511

(56) References Cited

U.S. PATENT DOCUMENTS

| | | |
|---|---|---|
| 3,011,800 A | 12/1961 | Mitsuyasu |
| 4,807,899 A * | 2/1989 | Belcher .................... 280/477 |
| 5,048,854 A * | 9/1991 | Clark ........................ 280/477 |
| 5,180,205 A | 1/1993 | Shoop |
| D347,721 S | 6/1994 | Carter |
| 5,882,029 A * | 3/1999 | Kennedy .................... 280/477 |
| 6,126,188 A * | 10/2000 | Volodarsky .............. 280/478.1 |
| 6,386,514 B1 * | 5/2002 | Ray ........................... 254/323 |
| 6,511,089 B1 * | 1/2003 | Kores, Sr. ................ 280/478.1 |
| 6,644,680 B1 * | 11/2003 | Coe ........................... 280/477 |

* cited by examiner

*Primary Examiner*—Tony Winner
(74) *Attorney, Agent, or Firm*—Gardner Groff, P.C.

(57) ABSTRACT

A trailer hitching apparatus comprises a trailer hitch receiver assembly, a winching device, a trailer hitch and a cable. The trailer hitch receiver assembly includes a receiver tube having a first end, a second end, an opening at the second end, and a passage extending from the opening toward the first end. The cable extends through the opening. The trailer hitch receiver assembly is mountable on a chassis of a vehicle. The winching device is mountable on at least one of the chassis of the vehicle and the trailer hitch receiver assembly. The trailer hitch includes a receiver stub configured for being engaged within the receiver tube through the opening at the second end of the receiver tube. The cable has a first end attached to a spool of the winching device and a second end attached to the receiver stub of the trailer hitch. When the cable is wound onto the spool of the winch, while the receiver stub of the trailer hitch is correspondingly pulling into the passage of the receiver tube, thereby engaging the trailer hitch within the trailer hitch receiver assembly.

5 Claims, 3 Drawing Sheets

TRAILER HITCHING APPARATUS

CROSS REFERENCE TO RELATED APPLICATIONS

This application claims the benefit of U.S. Provisional Patent Application Ser. No. 60/456,061 filed Mar. 20, 2003 entitled "Winch-N-Hitch".

FIELD OF THE DISCLOSURE

The disclosures herein relate generally to trailer hitches and trailer hitch receivers, and more particularly to arrangements for hitching a trailer to a tow vehicle.

BACKGROUND OF THE DISCLOSURE

Connecting a tongue of a trailer to a trailer hitch of a tow vehicle using conventional approaches is often a tedious task. This is particularly true when the trailer cannot be readily manipulated by hand. For example, when the weight of a trailer and/or the orientation of the trailer (e.g., on an incline) is such that the trailer cannot be readily moved by hand for facilitating connection of the tongue of the trailer to the trailer hitch, the tow vehicle must be backed to either a position with the trailer hitch aligned under the tongue of the trailer or a position where only slight manual maneuvering of the trailer is required to align the trailer hitch with the tongue of the trailer.

For several reasons, such conventional approaches for connecting a tongue of trailer to a trailer hitch of a tow vehicle often require two people. Typically, a first person backs the vehicle under direction of a second person. The directions from the second person aid in aligning the trailer hitch to the tongue of the trailer and in precluding the tow vehicle from being accidentally backed into the tongue of the trailer. In some cases, such conventional approaches require two people because one person has to maneuver and hold the trailer in position (i.e., the tongue aligned over the trailer hitch) while a second person lowers the tongue of the trailer (e.g., via a hand crank) onto a ball of the trailer hitch.

Therefore, a trailer hitching apparatus that overcomes limitations associated with conventional trailed hitch assemblies and trailer-hitching approaches would be useful and advantageous.

DETAILED DESCRIPTION

Figure 1:
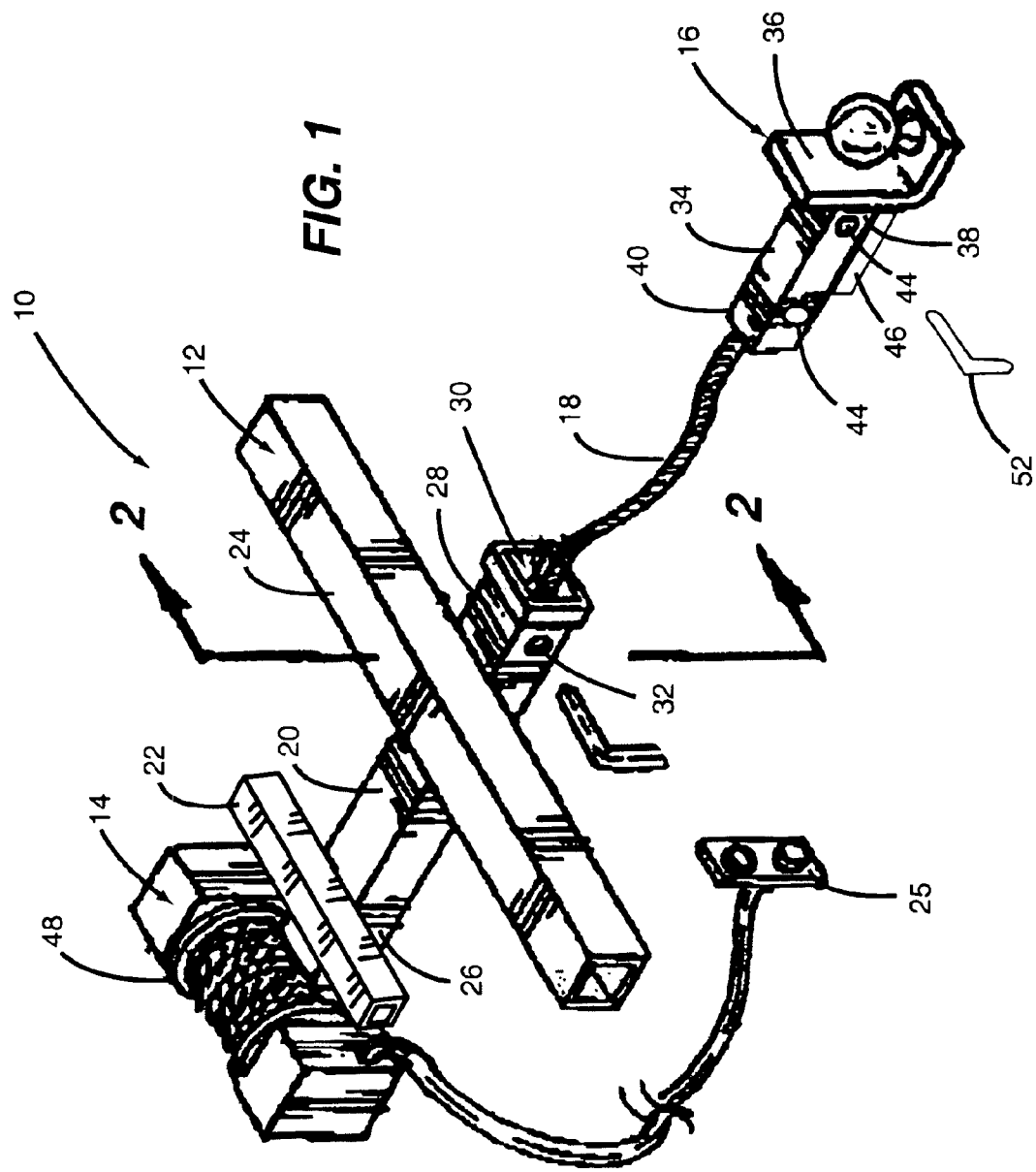
FIG. 1 depicts a trailer hitching apparatus in accordance with an embodiment of the disclosures made herein.

Apparatuses and methods in accordance with embodiments of the disclosures made herein are configured for engaging a trailer hitch with a trailer hitch receiver using a winching device. Such apparatuses and methods configured for overcoming limitations associated with conventional trailer hitch assemblies and trailer-hitching approaches. An objective of such apparatuses and methods is to allow a trailer that cannot be readily moved by hand to be connected to a tow vehicle by a single person in a relatively easy, safe and simple manner.

Apparatuses and methods in accordance with embodiments of the disclosures made herein are particularly advantageous and useful when a trailer that needs to be hitched to a tow vehicle cannot be readily manipulated by hand (e.g., manually rolled or pushed). In instances where the weight of the trailer and/or the orientation of the trailer (e.g., on an incline) is such that the trailer cannot be readily moved by hand for facilitating connection of the tongue of the trailer to the trailer hitch, such apparatuses and methods allow a single person to easily, safely and simply connect the trailer to the tow vehicle. Specifically, with the tow vehicle in a backed position achievable by a single person (i.e., backed into an approximate vicinity of the trailer without being directed by a second person), such apparatuses and methods allow the tow vehicle and trailer to be mechanically drawn into engagement with each other. Accordingly, such apparatuses and methods dramatically reduce the potential for damage to the tow vehicle and trailer and the potential for human injury during the trailer hitching process.

In one embodiment of the disclosures made herein, a trailer hitching apparatus comprises a trailer hitch receiver assembly, a winching device and a cable. The trailer hitch receiver assembly includes a receiver tube having a first end, a second end, an opening at the second end, and a passage extending from the opening toward the first end. The cable has a first end thereof configured for being attached to a spool of the winching device and a second end thereof configured for being connected to a receiver stub of a trailer hitch. At least one of the ends of the cable is configured for enabling the cable to be routed through the opening at the second end of the receiver tube thereby enabling the cable to be wound onto the spool of the winch while correspondingly pulling the receiver stub of the trailer hitch into the passage of the receiver tube. The winching device is configured for being mounted on at least one of the chassis of the vehicle and the trailer hitch receiver assembly. The trailer hitch receiver assembly includes a plurality of guide members mounted within the opening for aiding in engagement of the receiver stub within the receiver tube. A cable guide member is attached to the trailer hitch receiver assembly and the cable is partially wrapped around a circumference of the cable guide member for enabling the cable to be directed toward the spool of the winching device.

In another embodiment of the disclosures made herein, a trailer hitching apparatus comprises a trailer hitch receiver assembly, a winching device, a trailer hitch and a cable. The trailer hitch receiver assembly is mountable on a chassis of a vehicle and includes a receiver tube having a first end, a second end, an opening at the second end, and a passage extending from the opening toward the first end. The winching device is mountable on at least one of the chassis of the vehicle and the trailer hitch receiver assembly. The trailer hitch includes a receiver stub configured for being engaged within the receiver tube through the opening at the second end of the receiver tube. The cable has a first end thereof attached to a spool of the winching device and a second end thereof attached to the receiver stub of the trailer hitch. The cable extends through the opening of the receiver tube. A first end of the receiver stub is tapered for aiding in engagement with the receiver tube and the trailer hitch receiver assembly includes a plurality of guide members mounted within the opening of receiver tube for aiding in engagement of the receiver stub within the receiver tube.

The receiver stub includes a plurality of pin engaging holes formed therethrough. A first one of the pin engaging holes is positioned adjacent to a receiver tube engaging end of the receiver stub and a second one of the pin engaging holes is positioned adjacent to a tongue mounting end of the receiver stub. The second end of the cable is attached to a pin extending through the second one of the pin engaging holes. The trailer hitch includes a stop member attached thereto for limiting an insertion depth of the receiver stub within the receiver tube such that the first one of the pin engaging holes is approximately aligned with a mating hole at the second end of the receiver tube when the stop member contacts the receiver tube. A cable guide member is attached to the trailer hitch receiver assembly with the cable being partially wraps around a circumference of the cable guide member for enabling the cable to be directed toward the spool of the winching device. When the winch is activated for winding the cable onto the spool of the winch, the receiver stub of the trailer hitch is correspondingly pulled into the passage of the receiver tube.

In another embodiment of the disclosures made herein, a method for engaging a trailer hitch with a trailer hitch receiver comprises extending a cable through a receiver stub opening in a receiver tube of a trailer hitch receiver assembly, attaching a first end of the cable to a winching device, wrapping the cable partially around a circumference of the cable guide member for enabling the cable to be directed toward the spool of the winching device, attaching a second end of the cable to a receiver stub of a trailer hitch and operating the winching device for winding the cable onto the spool of the winching device thereby pulling the receiver stub of the trailer hitch, which is attached to the tongue of the trailer, into the passage of the receiver tube. The receiver tube includes a first end and a second end, and extending the cable through the receiver stub opening includes extending the cable through a passage of the receiver tube that extends from the receiver stub opening toward the first end of the receiver tube.

Turning now to the drawing figures, a trailer hitching apparatus 10 in accordance with an embodiment of the disclosures made herein is depicted in FIG. 1. The trailer hitching apparatus 10 comprises a trailer hitch receiver assembly 12, a winching device 14, a trailer hitch 16 and a cable 18. The trailer hitch receiver assembly 12 includes a receiver tube 20, a first mounting member 22 and a second mounting member 24. The trailer hitch receiver assembly 12 is mountable on a chassis of a tow vehicle via the first and second mounting members (22, 24) using commercially available fastening components (e.g., nuts, bolts and backing plates).

The winching device 14 is mountable on at least one of the chassis of the vehicle (not specifically shown) and the trailer hitch receiver assembly 12 (e.g., on the first end of the receiver tube 20). As depicted in FIG. 1, the winching device 14 is electrically powered and includes a winch control unit 25, which may be fixedly mounted on a rear portion of the tow vehicle (e.g., the bumper), fixedly mounted within a cabin of the tow vehicle, or detachably mounted for allowing it to be portable. It is contemplated herein that the winching device 14 may be an electrically-powered winching device or a hand-operated winching device.

The receiver tube 20 has a first end 26, a second end 28, an opening 30 (i.e., a receiver stub opening) at the second end 28, a lock pin hole 32 extending through opposing walls adjacent the second end, and a passage 33 extending from the opening 30 toward the first end 26. The first mounting member 22 is attached to the receiver tube 20 in a transverse orientation adjacent the first end 26 of the receiver tube 20. The second mounting member 24 is attached to the receiver tube 20 in a transverse orientation adjacent the second end 28 of the receiver tube 20.

Figure 2:
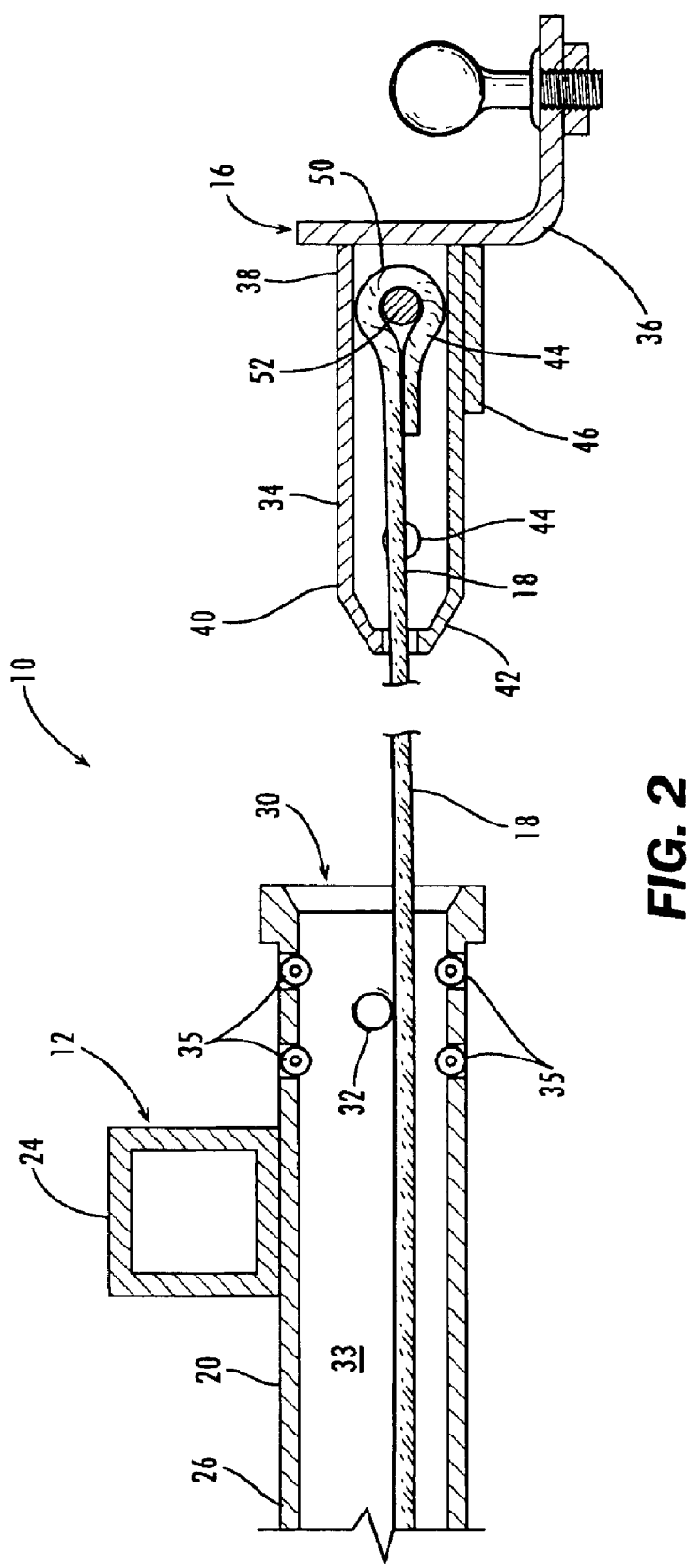
FIG. 2 is a cross sectional view taken along the line 2—2 in FIG. 1.

The trailer hitch 16 includes a receiver stub 34 and a ball mounting flange 36. The ball mounting flange 36 is attached to the receiver stub 34 at a tongue mounting end 38 (i.e., a first end) of the receiver stub 34. A receiver tube engaging end 40 (i.e., a second end) of the receiver stub 34 has tapered faces 42 for aiding in engagement of the receiver stub 34 with the receiver tube 20. As shown in FIG. 1, it is contemplated herein that the surfaces of the passage 33 that define the opening 30 may be tapered, and as shown in FIG. 2, the surfaces may have guide members 35, preferably in the form of rollers mounted therein for further aiding in engagement of the receiver stub 34 with the receiver tube 20.

The receiver stub 34 includes a plurality of pin engaging holes 44 formed through opposing faces of the receiver stub 34. A first one of the pin engaging holes 44 is positioned adjacent to the receiver tube engaging end 40 of the receiver stub 34. A second one of the pin engaging holes 44 is positioned adjacent to the tongue mounting end 38 of the receiver stub 34.

A stop member 46 (e.g., a piece of rectangular bar stock) is attached to the receiver stub 34 and/or to the ball mounting flange 36. The stop member 46 is configured for limiting an insertion depth of the receiver stub 34 within the receiver tube such that the first one of the pin engaging holes is approximately aligned with a mating hole at the second end of the receiver tube when the stop member 46 contacts the receiver tube.

The cable 18 has a first end (not specifically shown) attached to a spool 48 of the winching device 14 and a second end 50 thereof attached to the receiver stub 34 of the trailer hitch. The cable 18 extends through the opening 30 and passage 33 of the receiver tube 20. The second end 50 of the cable 18 is attached within the receiver stub 34 to a pin 52 extending through the second one of the pin engaging holes 44 (i.e., the hole closest to the tongue mounting end 38 of the receiver stub 34).

Cable specifications (e.g., load rating) are dependent on the strength necessary for a given application and or load rating. Similarly, specifications for winching devices, lock pins and other physical and mechanical aspects/components of trailer hitching apparatuses in accordance with embodiments of the disclosures made herein are dependent upon requirements for particular applications.

Figure 3:
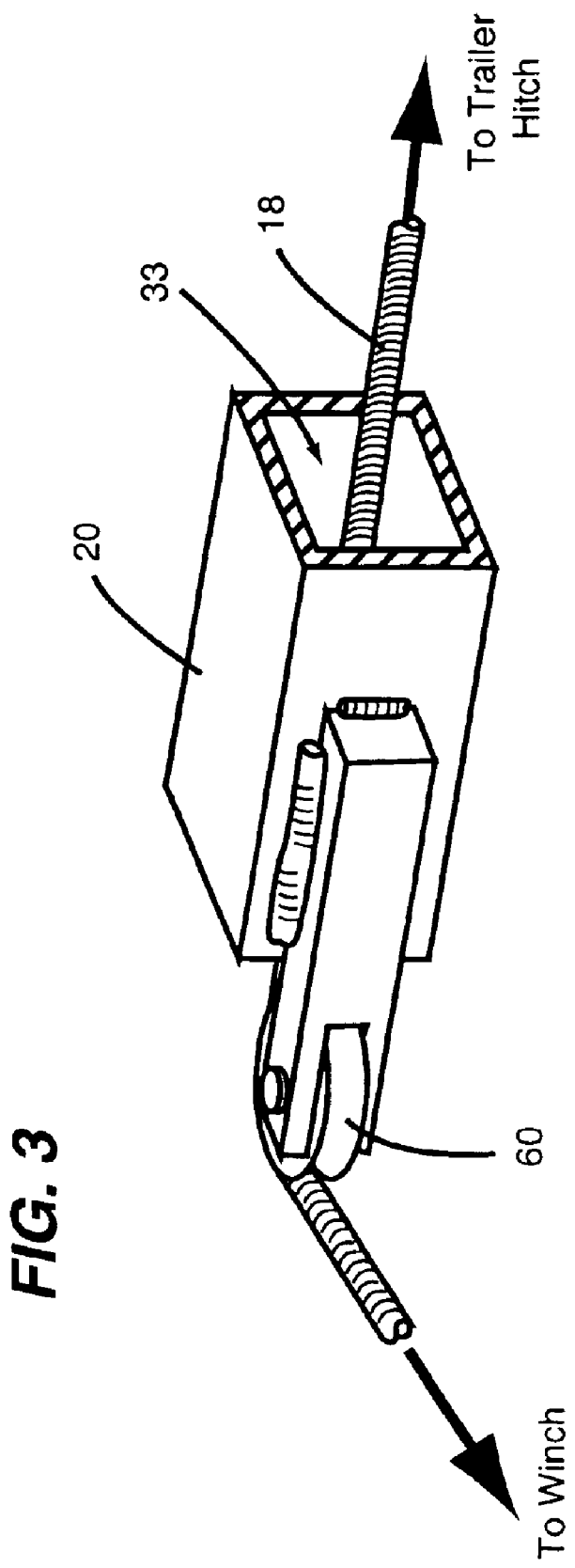
FIG. 3 depicts a cable guiding member in accordance with an embodiment of the disclosures made herein.

FIG. 3 depicts an embodiment a cable guiding member 60 attached to the receiver tube 20 of the trailer hitch receiver assembly 12 depicted in FIGS. 1 and 2. A pulley and a roller are examples of the cable guide member 60. As depicted, the cable guide member 60 is attached to the receiver tube 20 adjacent to the first end 26 of the receiver tube 20. The cable 18 is wrapped partially around a circumference of the cable guide member 60 for enabling the cable 18 to be directed toward the spool 48 of the winching device 14. In this manner, placement and orientation of the winching device 14 is not limited to being in-line with the passage 33. For example, through the use of and appropriate orientation of the cable guiding member 60, the winching device 14 may be located to the side, above or below the receiver tube. Exact placement of the cable guiding member 60 is dependent upon placement of the winching device 14.

It is contemplated that the cable guiding member 60 may extend partially through an aperture in a wall of the receiver tube 20 at a location between the first and second ends of the receiver tube 20. In this manner, the cable guiding member 60 facilitated the cable 18 to extend through a wall of the receiver tube 20 (e.g., mid way between the first and second ends (26, 28) of the receiver tube 20. Such an arrangement is useful as it increases the number of potential mounting locations for the winching device 14. It is contemplated that the cable guide member 60 may be fixedly mounted (i.e., rotates about a single axis) or pivotally mounted (i.e., rotates about one of a plurality of instant axes). It is contemplated herein that the cable guide member 60 may be mounted within the passage 33 of the receiver tube 20, on the winching device 14 or an ancillary tube (not specifically shown) of the cable hitching apparatus 10.

In operation, apparatuses in accordance with embodiments of the disclosures made herein provide for a novel useful and advantageous method for engaging a trailer hitch with a trailer hitch receiver to be carried out. The method includes extending a cable through a receiver stub opening in a receiver tube of a trailer hitch receiver assembly, attaching a first end of the cable to a winching device, attaching a second end of the cable to a receiver stub of a trailer hitch and attaching the trailer hitch to the tongue of a trailer. With the receiver stub at a lower height than that of the receiver tube, the winching device is then operated such that the cable is wound onto the spool of the winching device thereby pulling the receiver stub of the trailer hitch, which is attached to the tongue of the trailer, into the passage of the receiver tube. A lock pin may then be inserted through the receiver tube and receiver stub for securing them together. Accordingly, apparatuses and methods in accordance with embodiments of the disclosures made herein allow a trailer that cannot be readily moved by hand to be connected to a tow vehicle by a single person in a relatively easy, safe and simple manner.

Preferably, the winching device of trailer hitching apparatus in accordance with an embodiment of the disclosures made herein is mounted on the tow vehicle. However, it is contemplated herein that, in some embodiments of the disclosures made herein, the winching device is be mounted on the trailer. In such embodiments, the cable passes through the receiver stub of the trailer hitch, though the receiver stub opening of the receiver tube and is connected to the trailer hitch receiving assembly or to the chassis of the vehicle. In this manner, an apparatus having such an arrangement is capable of providing trailer hitching functionality in accordance with the disclosures made herein.

An apparatus in accordance with embodiments of the disclosures made herein is designed to facilitate connecting a trailer to a towing hitch. In doing so, such an apparatus provides a user with a wider margin of error when backing a tow vehicle up to a trailer to make a connection. Installation of such an apparatus requires the investment of time and money. However, once installed, such an apparatus is relatively simple and inexpensive to operate. Furthermore, it is capable of being operated by a single person with minimal physical exertion and use of time.

Apparatuses in accordance with embodiments of the disclosures made herein are capable of being fabricated using known fabrication techniques and commercially available materials. For example, steel tubing is a preferred choice for the major components of a trailer hitch receiver assembly and trailer hitch. Such major components may be fabricated using know operations such as cutting, drilling, welding and bending.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. To avoid unnecessary detail, the description omits certain information known to those skilled in the art. For example, certain dimensions of elements of an infusion device, certain orientations of elements, specific selection of materials for various elements and the like may be implemented based on an engineering preference and/or a specific application requirement. The preceding detailed description is, therefore, not intended to be limited to the specific forms set forth herein, but on the contrary, it is intended to cover such alternatives, modifications, and equivalents, as can be reasonably included within the split and scope of the appended claims.

What is claimed is:

1. A trailer hitching apparatus, comprising:
   a trailer hitch receiver assembly including a receiver tube having a first end, a second end, an opening at the second end, and a passage extending from the opening toward the first end;
   a winching device; and
   a cable having a first end thereof configured for being attached to a spool of the winching device and a second end thereof configured for being connected to a receiver stub of a trailer hitch, wherein at least one of said ends is configured for enabling the cable to be routed through the opening at the second end of the receiver tube thereby enabling the cable to be wound onto the spool of the winch while correspondingly pulling the receiver stub of the trailer hitch into the passage of the receiver tube,
   wherein the trailer hitch receiver assembly includes a plurality of guide members mounted within the opening, said guide members aiding in engagement of the receiver stub within the receiver tube.

2. A trailer hitching apparatus, comprising:
   a trailer hitch receiver assembly mountable on a chassis of a vehicle, wherein the trailer hitch receiver assembly includes a receiver tube having a first end, a second end, an opening at the second end, and a passage extending from the opening toward the first end;
   a winching device mountable on at least one of the chassis of the vehicle and the trailer hitch receiver assembly;
   a trailer hitch including a receiver stub configured for being engaged within the receiver tube through the opening at the second end of the receiver tube, wherein a receiver tube engaging end of the receiver stub is tapered for aiding in engagement with the receiver tube; and
   a cable having a first end thereof attached to a spool of the winching device and a second end thereof attached to the receiver stub of the trailer hitch, wherein the cable extends through the opening, and wherein the trailer hitch receiver assembly includes a plurality of guide members mounted within the opening, said guide members aiding in engagement of the receiver stub within the receiver tube.

3. A trailer hitching apparatus, comprising:
   a trailer hitch receiver assembly mountable on a chassis of a vehicle, wherein the trailer hitch receiver assembly includes a receiver tube having a first end, a second end, an opening at the second end, and a passage extending from the opening toward the first end;
   a winching device mountable on at least one of the chassis of the vehicle and the trailer hitch receiver assembly;
   a trailer hitch including a receiver stub configured for being engaged within the receiver tube through the opening at the second end of the receiver tube;
   a cable having a first end thereof attached to a spool of the winching device and a second end thereof attached to the receiver stub of the trailer hitch, wherein the cable extends through the opening, wherein the receiver stub includes a plurality of pin engaging holes formed therethrough; a first one of said pin engaging holes is positioned adjacent to a receiver tube engaging end of the receiver stub; a second one of said pin engaging holes is positioned adjacent to a tongue mounting end of the receiver stub; and the second end of the cable is attached to a pin extending through the second one of said pin engaging holes.

4. The apparatus of claim 3 wherein:

the trailer hitch includes a stop member attached thereto; and the stop member is configured for limiting an insertion depth of the receiver stub within the receiver tube such that the first one of said pin engaging holes is approximately aligned with a mating hole at the second end of the receiver tube when the stop member contacts the receiver tube.

5. A method for engaging a trailer hitch with a trailer hitch receiver, comprising:

extending a cable through a receiver stub opening in a receiver tube of a trailer hitch receiver assembly;

attaching a first end of the cable to a winching device; and attaching a second end of the cable to a receiver stub of a trailer hitch;

wherein the receiver tube includes a first end and a second end;

extending the cable through the receiver stub opening includes extending the cable through a passage of the receiver tube that extends from the receiver stub opening toward the first end of the receiver tube; and operating the winching device for winding the cable onto the spool of the winching device thereby pulling the receiver stub of the trailer hitch into the passage of the receiver tube;

wherein the receiver stub includes a plurality of pin engaging holes formed therethrough;

a first one of said pin engaging holes is positioned adjacent to a receiver tube engaging end of the receiver stub;

a second one of said pin engaging holes is positioned adjacent to a tongue mounting end of the receiver stub;

the second end of the cable is attached to a pin extending through the second one of said pin engaging holes; and said operating the winching device is performed until the first one of said pin engaging holes is approximately aligned with a mating hole at the second end of the receiver tube.

* * * * *